March 1, 1966 R. THIRION 3,237,725
AUTOMATIC ADJUSTER
Filed Aug. 15, 1963 2 Sheets-Sheet 1

United States Patent Office 3,237,725
Patented Mar. 1, 1966

3,237,725
AUTOMATIC ADJUSTER
René Thirion, Paris, France, assignor to Société Anonyme D.B.A., Paris, France, a company of France
Filed Aug. 15, 1963, Ser. No. 302,354
Claims priority, application France, Sept. 4, 1962, 908,517
13 Claims. (Cl. 188—79.5)

This invention relates to brakes or the like, and more particularly to automatic adjusting devices for brakes or the like.

One object of the present invention is to provide an automatic adjusting device for brakes or the like which is simple in construction and reliable in operation.

The present invention applies more particularly to brakes or the like comprising a fixed support, a rotatable member having a friction surface thereon, and a mechanism for applying a friction member against the friction surface with the mechanism comprising a lever pivotally mounted on the fixed support and force transmitting means interposed between the lever and friction member.

Another object of the present invention is to provide brakes or the like of the above described type with an automatic adjusting device which can be easily incorporated in the brake applying mechanism.

A further object of the invention is to provide brakes or the like of the above described type having a force transmitting screw and nut assembly of adjustable length interposed between the lever of the applying mechanism and the friction member with an automatic adjusting device for adjusting the length of said screw and nut assembly upon rotation of the lever in excess of a predetermined angle.

Other objects and features of the invention will more fully appear from the following description of one embodiment of the invention proceeding with reference to the accompanying drawings in which.

Figure 1:
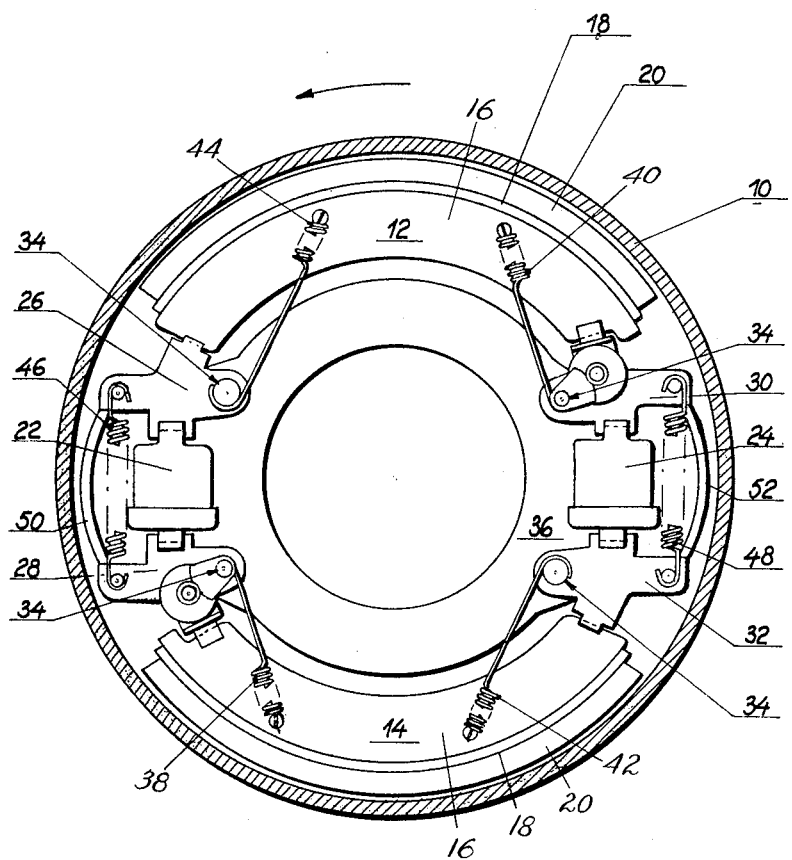
FIGURE 1 is an elevation view of a shoe brake embodying the present invention.

The brake shown in FIGURE 1 comprises a rotatable drum 10, and two shoes 12 and 14 formed of a web 16 and an arcuate rim 18 lined with a friction lining 20. Two hydraulic cylinders 22 and 24 are disposed between the adjacent ends of the shoes. These cylinders act on the shoe ends through the intermediary of levers 26, 28, 30 and 32 mounted for pivotal movement on pins 34 secured to the support plate 36 of the brake. The cylinders 22 and 24 have no connection with the plate 36 and comprise a single piston which acts on one lever of each pair, the respective cylinder body acting directly on the other lever of each pair. Shoe return springs 38, 40, 42 and 44 are stretched between the shoes 12 and 14 and the pins 34. Lever return springs 46 and 48 hold the outer ends of the levers in engagement with anchoring abutments 50 and 52, formed from bent up portions of the plate 36, when the brake is in its released condition.

Figure 2:
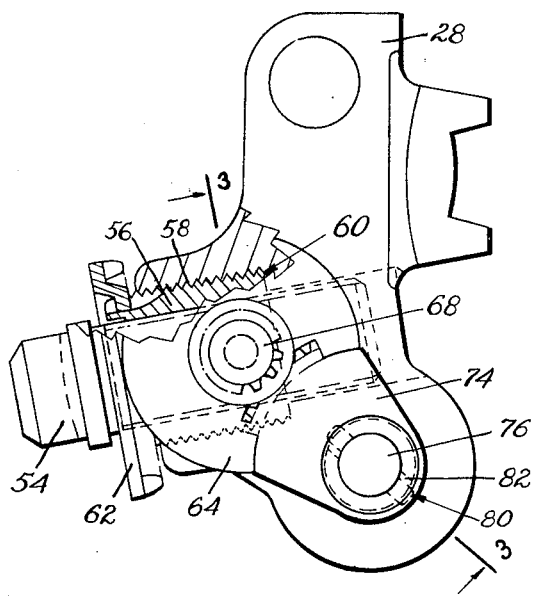
FIGURE 2 is an enlarged view of the automatic adjusting device of the brake shown in FIGURE 1.
Figure 3:
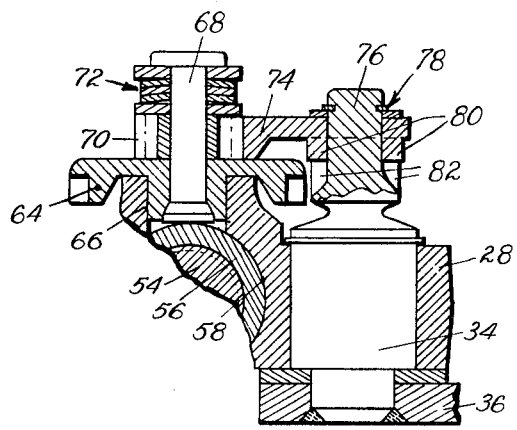
FIGURE 3 is a sectional view taken along line 3—3 of FIGURE 2.

An automatic adjusting device is interposed between each one of the levers 28 and 30 and their respective adjacent end of the shoes. Both devices are identical and therefore, only one will be described with reference to FIGURES 2 and 3 of the drawings which show the lever 28 and its associated adjusting device. The device comprises a screw 54 threadedly received in a threaded nut or sleeve 56 rotatably mounted in a bore 58 drilled in the lever 28. A slot is provided on the head of the screw for receiving the web 16 of shoe 14 therein. The inner end of nut 56 abuts a shoulder 60 of bore 58. A toothed wheel 62 is attached at the outer end of sleeve 56 and meshes with another toothed wheel 64 having a cylindrical hub which is journalled in a bore 66 drilled in the lever 28 parallel to the axis of pin 34. The toothed wheel 64 carries a pin 68 on which a pinion is rotatably mounted and urged against the upper face of the wheel 64 by resilient washers 72 compressed between the pinion 70 and an enlarged head of pin 68. The pinion 70 meshes with a toothed sector 74 journalled on a reduced diametered end 76 of pin 34 and a snap ring 78 retains the sector 74 against axial outer movement. The sector 74 has on its lower face two diametrally opposed tabs which are located in axial grooves 82 formed on the end 76 of pin 34. The circumferential width of these grooves are larger than that of the tabs 80 to allow limited rotation of the sector 74 about the pin 34.

In operation, when hydraulic pressure is admitted into cylinders 22 and 24, the latter apply the shoes 12 and 14 on the drum 20 through the intermediary of levers 26, 28 30 and 32. Assuming that the drum rotates in the direction of the arrow in FIGURE 1, the shoes 12 and 14 abut on levers 26 and 32, respectively, which anchor on abutments 50 and 52. Shoe 14 is applied against the drum by lever 28 which rotates about pin 34 and drives in rotation the toothed sector 74 which is connected to the lever through the intermediary of pinion 70. Rotation of the pinion 70 about pin 68 is prevented by the friction forces developed between the pinion and the wheel 64 by the axial compression of washers 72. If the rotation of lever 28 does not exceed the limited rotation angle allowed the toothed sector 74, the relative position of the various parts of the automatic adjusting device is not modified, and when the pressure is reduced in the cylinders 22 and 24, the return springs 46 and 48 return the shoes 12 and 14 to their initial position. If the rotation of lever 28 exceeds the limited rotation angle of toothed sector 74, due to wear of the shoe linings, then the lever 28 will rotate with respect to the toothed sector 74 and cause the pinion 70 to rotate about pin 68. Although the pinion 70 is frictionally coupled to the toothed wheel 64, the latter is not driven in rotation by the pinion because this wheel meshes with the wheel 62 secured to the nut 56, the rotation of which is prevented by the friction forces developed between the threads of screw 54 and nut 56 and between the inner end of the nut and the shoulder 60 by the applying force transmitted to the shoe 14 through the screw and nut assembly. Therefore, the pinion 70 is rotated relatively to the wheel 64. When the pressure is reduced in the cylinders 22 and 24, the lever 28 and the toothed sector 74 are returned by spring 46 to their initial position, which is constant, and during this return movement the lever is necessarily rotated with respect to the sector 74 in a direction opposite to that of the relative rotation which occurred during the applying movement of the lever. This relative rotation in the opposite direction causes the pinion 70 to rotate and to drive in rotation the wheels 64 and 62, since the screw and nut assembly is then only loaded by the force of spring 38 and the compression of resilient washers 72 is such that the torque which may be transmitted through the frictional connection between the pinion 70 and the wheel 64 is higher than the torque required for rotating the nut 56 in the released condition of the brake. The direction of the threads of screw 54 and nut 56 is such that the rotation of the wheel 62 upon return of the lever 28 to its released position causes an increase in length of the screw and nut assembly and moves the end of shoe 14 away from lever 28. It is obvious that the automatic adjusting device associated with the lever 30 operates in the same manner to move the shoe 12 closer to the drum 10 as the shoe lining 20 wears. And thus the stroke of the brake control device is kept constant.

Although the invention has been described in its application to a two leading shoe drum brake, it is obvious that the device of the invention is useful in various other types of brakes or the like, and I intend to include all modifications and adaptations of the described device which are within the capabilites of those skilled in the art and which fall within the scope of the invention as defined in the attached claims.

I claim:

1. A brake comprising a fixed support, a rotatable member having a friction surface thereon, a friction member, a lever pivoted on said fixed support for applying said friction member on said friction surface, force transmitting means interposed between said lever and friction member and comprising a screw and nut assembly, one part of said screw and nut assembly being rotatably mounted on said lever, and means for varying the length of said force transmitting means comprising a pinion frictionally coupled to said one part of the screw and nut assembly and rotatably mounted on said lever, and a toothed sector rotatably mounted about the pivoting axis of said lever for limited rotation over a predetermined angle, said toothed sector meshing with said pinion, whereby the rotation of said lever in excess of said predetermined angle causes said one part of the screw and nut assembly to rotate relatively to the other part of said assembly.

2. A brake as defined in claim 1 wherein said pinion is rotatably mounted on a pin affixed to said lever and lying parallel to the pivoting axis of said lever.

3. A brake as defined in claim 2 wherein said pinion is frictionally coupled to a toothed wheel connected to said one part of the screw and nut assembly.

4. An internal shoe drum brake comprising a fixed support, a rotatable drum, an arcuate shoe adapted to be applied against said drum, a lever disposed adjacent one end of said shoe and pivotally mounted at one of its end on said fixed support, applying means acting on the other end of said lever, a force transmitting screw and nut assembly between said lever and the adjacent end of said shoe, one part of said assembly being rotatably mounted on said lever and the other part being non rotatably connected to said shoe, and means for varying the length of said assembly comprising a pinion frictionally coupled to said one part of the assembly and rotatably mounted on said lever, and a toothed sector rotatably mounted about the pivoting axis of said lever for limited rotation over a predetermined angle, said toothed sector meshing with said pinion, whereby the rotation of said lever in excess of said predetermined angle causes said one part of the assembly to rotate relatively to the other part of the assembly.

5. A brake as defined in claim 4 wherein said pinion is rotatably mounted on a pin affixed to said lever and lying parallel to the pivoting axis of said lever.

6. A barke as defined in claim 5 wherein said pinion is frictionally coupled to a first toothed wheel rotatably mounted on said pin and meshing with a second toothed wheel connected to said one part of the screw and nut assembly.

7. A brake as defined in claim 6 wherein said first toothed wheel and pinion have cooperating friction surfaces which are urged into engagement one with another by resilient means.

8. A brake as defined in claim 4 wherein said lever and toothed sector are rotatably mounted on a pin attached to said fixed support, and said toothed sector and pin have cooperating stop means which limit the rotation of said toothed sector with respect to the pin.

9. In a brake, an automatic adjuster comprising: a pivotable brake applying first member, extendible means carried by said applying member, said extendible means including an element for varying the length thereof, a second member mounted on said first member for relative rotation therebetween and operatively connected to said element for varying the length of said extendible means, a third member drivingly connected to said second member, means mounting said third member for pivotable movement, means limiting the pivoting angle of said third member, said connection between said second and third members being so constructed that said first, second and third members will pivot as a unit until said third member is stopped from pivoting and upon further pivoting of said first member effects rotation of said second member relative to said first member to vary the length of said extendible means.

10. In a brake, an automatic adjuster comprising: a pivotable brake applying first member, extendible means carried by said applying member, said extendible means including an element for varying the length thereof, a second member rotatably mounted on said first member, a third member frictionally coupled to said element for varying the length thereof, means mounting said third member for pivotable movement thereof, means limiting the pivoting angle of said third member, means drivingly connecting said third member to said second member to effect unitary pivotal movement of said members and to effect rotation of said second member upon relative movement between said second and third members when said third member is prevented from pivoting by said limiting means, whereby all of said members move as a unit until said third member is stopped by said limiting means and thereafter said second member either drives said element or rotates relative thereto depending upon the resistance to rotation of said element.

11. In a brake, an automatic adjuster comprising: a pivotable brake applying first member, extendible means carried by said applying member, said extendible means including an element for varying the length thereof, a second member rotatably mounted on said first member, a third member, means mounting said third member for pivotable movement thereof, means limiting the pivoting angle of said third member, means drivingly connecting said third member to said second member to effect unitary pivotal movement of said members and to effect rotation of said second member upon relative movement between said second and third members when said third member is prevented from pivoting by said limiting means, a fourth member rotatably mounted on said first member and drivingly connected to said element for varying the length thereof and thereby said extendible means, a friction connection between said second and fourth members, whereby all of said members move as a unit until said third member is stopped by said limiting means and thereafter said second member either drives said fourth member or rotates relative thereto depending upon the resistance to rotation of said fourth member imparted thereon by said element.

12. The structure as recited in claim 11 wherein said second member is a pinion and said third member is a toothed sector meshing with said pinion.

13. The structure as recited in claim 12 wherein said extendible means comprises a rotatable nut and a threaded member received thereby, said nut has a plurality of teeth thereon and said fourth member has teeth thereon meshing with the teeth of said nut.

References Cited by the Examiner

FOREIGN PATENTS 675,244  10/1929  France.

MILTON BUCHLER, *Primary Examiner.*

DUANE A. REGER, ARTHUR L. LA POINT,
*Examiners.*